United States Patent [19]

Usher

[11] 4,417,733
[45] Nov. 29, 1983

[54] METHOD OF PRODUCING HIGH TEMPERATURE COMPOSITE SEAL

[75] Inventor: Peter P. Usher, Union, N.J.

[73] Assignee: Metex Corporation, Edison, N.J.

[21] Appl. No.: 203,557

[22] Filed: Nov. 5, 1980

Related U.S. Application Data

[63] Continuation of Ser. No. 949,580, Oct. 10, 1978, abandoned, which is a continuation-in-part of Ser. No. 856,174, Nov. 30, 1977.

[51] Int. Cl.³ .................... F16J 15/12; B32B 31/06
[52] U.S. Cl. ............................. 277/1; 277/30; 277/204; 277/230; 277/233; 277/DIG. 6; 285/412; 285/DIG. 11; 264/258; 264/324; 264/512; 264/516
[58] Field of Search .................. 277/1, 12, 30, 47, 48, 277/101, 102, 105, 106, 204, 229, 230, 233, 234, 235 R, 235 A, 235 B, 236, DIG. 6; 285/187, 363, 368, 405, 412, DIG. 11, DIG. 18; 29/520; 264/103, 248, 257, 258, 268, 273, 324, 501, 502, 512, 516, 563

[56] References Cited

U.S. PATENT DOCUMENTS 2,398,210 4/1946 Cumming et al. ............. 277/230 X
2,924,471 2/1960 Poltorak et al. ............... 277/230 X
3,404,061 10/1968 Shane et al. ...................... 428/313

FOREIGN PATENT DOCUMENTS 972650 10/1964 United Kingdom .

Primary Examiner—Robert S. Ward, Jr.
Attorney, Agent, or Firm—Amster, Rothstein & Engelberg

[57] ABSTRACT

A high temperature seal, particularly suitable for use in vehicle engine exhaust systems, is formed of refractory sheet material which is first placed within a wire mesh sleeve. The sleeve is then wound into a cylindrical preform and axially compressed to provide a unified structure in which the mesh sleeve and sheet material are firmly interlocked.

3 Claims, 4 Drawing Figures

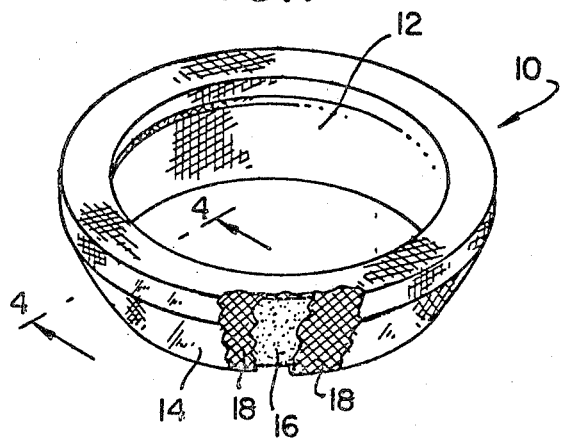
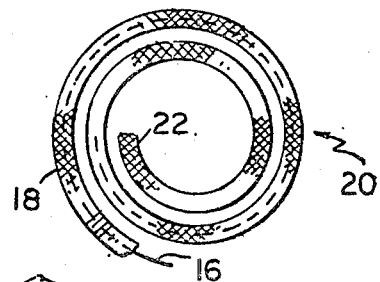
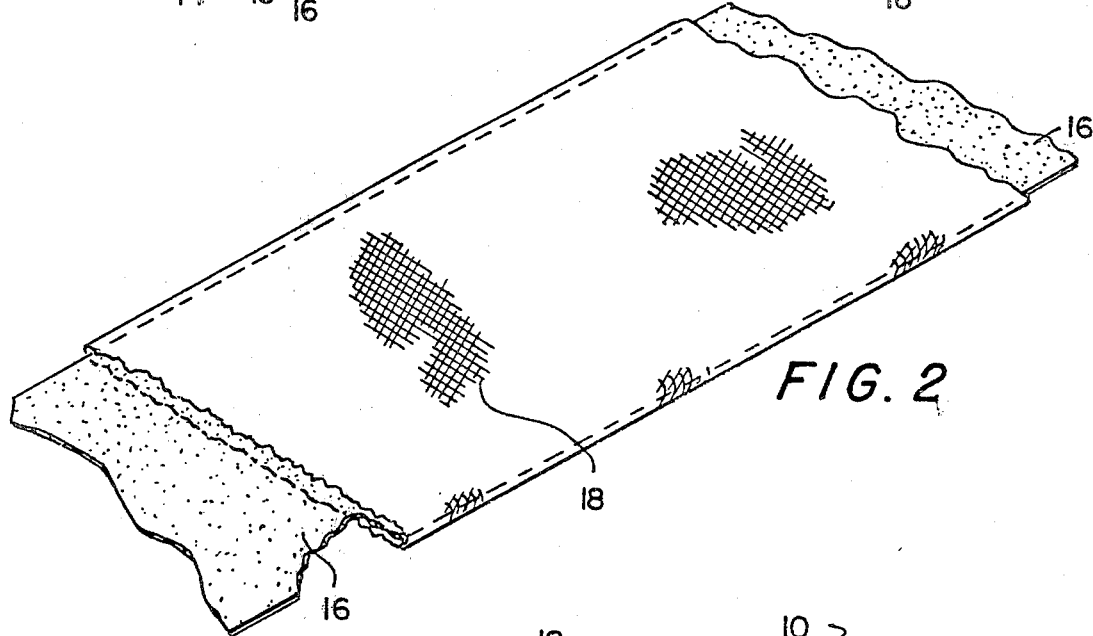
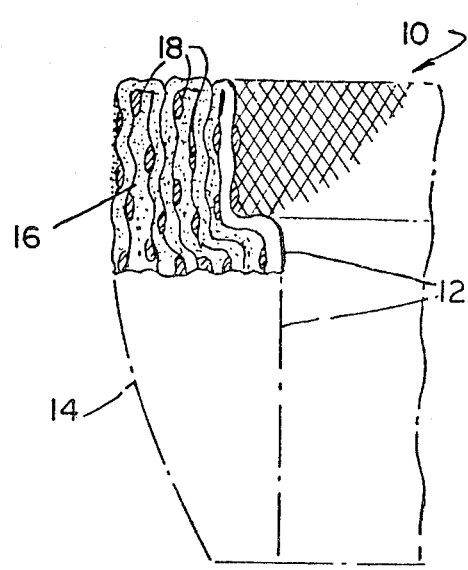

METHOD OF PRODUCING HIGH TEMPERATURE COMPOSITE SEAL

This is a continuation of application Ser. No. 949,580, now abandoned, filed Oct. 10, 1978, which is a continuation-in-part of application Ser. No. 856,174, filed Nov. 30, 1977.

The present invention relates generally to high temperature exhaust seals and, more particularly, to a composite seal including flexible refractory sheet material and wire mesh, the seal being especially useful in vehicle exhaust systems.

There are two general approaches to mounting a vehicle engine. In one aproach, the engine is mounted so that its crankshaft runs longitudinally with respect to the vehicle body (hereinafter referred to as a longitudinally mounted engine). In the other approach, the engine is mounted so that its crankshaft runs transversely with respect to the vehicle body (hereinafter referred to as a transversely mounted engine). The latter arrangement is particularly useful for front wheel driven vehicles.

With regard to the exhaust systems appurtenant to these engines, it will be apparent that a particular exhaust system, which includes an engine exhaust manifold and tail pipe, will vary in its configuration depending upon the engine mounting orientation with respect to the vehicle, i.e., longitudinal or transverse.

For example, in the case of a longitudinally mounted engine, an exhaust manifold pipe extends from the engine exhaust manifold down alongside of the engine, and usually has a flange joined at its opened end which faces downward for connection to a mating flange on a tail pipe running beneath the vehicle. With this configuration, a seal is usually disposed between the connected flanges for preventing exhaust gas leakage out around the joined flanges. Movement of the exhaust manifold, such as caused by normal operation of the engine, is fully communicated to the tail pipe by way of the joined flanges. Stresses caused by the tail pipe movement are absorbed by flexible mountings (also known as hangers) which secure the tail pipe to the underside of the vehicle body. The typical exhaust seals therefore need not absorb any of these stresses and, because of this, they are of relatively simple construction. A typical seal used in longitudinally mounted engine applications is made of cast iron, and has tapered bearing surfaces which cooperate with the surfaces of the flanges to effect a tight seal. Other seals for these applications employ a laminate construction including asbestos and perforated sheet steel. Still other conventional seals may include impregnated asbestos yarn knitted withn a wire mesh, these materials being pressed together to form the seal. In some instances, no seal is used at all, the flanges themselves effecting a sealed joint when connected together.

Transversely mounted engines, however, present a more difficult problem. Usually, the exhaust manifold pipe extends downward alongside the engine and has a flange at its opened end which also faces generally downward. However, normal engine operating movement resulting from rotational momentum of the crankshaft and opposing torsional forces of the driveshaft causes the exhaust manifold pipe flange to reciprocate in such a manner that the central axis of the pipe, which is perpendicular to the plane of the flange, departs from a substantially vertical line and becomes inclined alternately towards the front and rear of the vehicle. It is necessary to use a flexible joint between the exhaust manifold and the tail pipe to absorb this movement; otherwise it will be communicated directly to the tail pipe causing intolerable stresses and strains. Such stresses and strains can cause metal fatigue and accelerate failure of the tail pipe. Excessive noise can also be generated by vibrations induced by the stress reversals.

It will therefore be understood that with a transversely mounted engine, the exhaust seal in the flexible joint must be capable of permitting a degree of relative rotation between the exhaust manifold and tail pipes and still maintain an effective exhaust gas seal. Exhaust seals which are useful with longitudinally mounted engines are undesirable for use in vehicles having transversely mounted engines, because they cannot withstand the relative rotative movement and stress encountered in the flexible exhaust joints used with the latter. An attempt to overcome this problem has been to include a section of corrugated pipe between the exhaust manifold and the tail pipe in the hopes that the corrugated section could absorb the relative rotative movement and stresses produced therebetween. In practice, this solution has not proved successful since the corrugated pipe frequently fractures as a result of mechanical fatigue under high temperature operating conditions.

A "ball and socket" type joint such as, for example, that shown in U.S. Pat. No. 3,188,155, is also known to allow exhaust pipes to be sealingly jointed in off axial alignment with each other. The joint disclosed in that patent, however, is not satisfactory for permitting relative rotative movement of the joined pipes, since bolts which pass through unslotted openings in the joing pressure plate to rotate in unison.

Another exhaust seal, for use in a flexible exhaust joint adapted to allow for relative rotative pipe movement, includes graphite sheet material surrounding perforated sheet metal. Such a seal has, however, been proven to be unsatisfactory in meeting the severe operating requirements of a flexible joint. In particular, the seal lacks structural integrity and, under normal operating stress, its composite layers of graphite and sheet metal tend to separate from one another causing failure of the seal.

The present invention provides an exhaust seal capable of meeting the rigorous operating requirements imposed by a flexible exhaust joint, is particularly suitable for use in transversely mounted engine exhaust systems, and can be effectively used therein as well as in many other applications which will be apparent to one skilled in the art upon reading of the disclosure herein.

An exhaust seal according to the present invention is produced by inserting a flexible strip of refractory sheet material within a flexible sleeve of wire mesh having open voids therein. The mesh sleeve is convolutely wound with the sheet material therein to define a cylindrical preform. The preform is then axially compressed so that the sheet material and mesh are mutually substantially deformed as they securely combine into desired form of the seal.

An important advantage of the exhaust seal according to the present invention is its unusually high resiliency which makes it particularly suitable for use in flexible exhaust joints which connect exhaust manifold and tail pipes together in vehicles having transversely mounted engines. This resiliency allows the seal to absorb a high degree of rotative stress when positioned within the flexible joint. Additionally, the present seal permits relative rotative movement of the pipe which engages its bearing surface, and still maintains an effective seal against exhaust gases passing through both of the joined pipes.

Other advantages and applications for the exhaust seal of the present invention will be apparent upon a reading of the following detailed description thereof with reference to the accompanying drawings, wherein:

FIG. 1 is a perspective, partially fragmented view of an exhaust seal according to the present invention, showing its component refractory and wire mesh materials extending through its cross section;

FIG. 2 is a perspective, fragmented view of a flexible sleeve of the wire mesh and a flexible strip of the refractory material inserted within the sleeve, in accordance with the present invention;

FIG. 3 is an exaggerated, end view of a preform defined by convolutely winding the mesh sleeve with the strip of refractory material therein, according to the present invention; and FIG. 4 is an enlarged, fragmented, partially cross sectional view of the exhaust seal as taken substantially along line 4—4 in FIG. 1, schematically illustrating the mutual deformation of the mesh and refractory materials after the preform of FIG. 3 is axially compressed to form the seal, in accordance with the present invention.

Referring now in detail to the drawings, and initially to FIG. 1 thereof, an exhaust seal according to the present invention is designated generally by the reference numeral 10. The seal 10 is in endless ring form, and has an inner radial surface 12 and an outer radial surface 14. The surface 12 and 14 are formed to sealingly engage confronting surfaces on pipes and pipe flanges to be joined to one another, respectively, including such surfaces as presented by a flexible "ball and socket" joint in an engine exhaust system. For example, inner surface 12 may be dimensioned to closely slidingly engage an outer end of a first exhaust pipe, and outer surface 14 may be contoured to accommodate a correspondingly flared end of a second pipe to be joined to the first for relative rotative movement.

Exhaust seal 10 includes refractory material 16 and knitted wire mesh 18. In accordance with the present invention, the refractory material 16 and the mesh 18 are mutually deformed into a desired final configuration for the seal, such as appears in FIG. 1. It will be understood, however, that seals having overall contours which differ from the seal 10 of FIG. 1 can be provided, so that various confronting surfaces can be accommodated for relative rotational movement by the seal.

FIGS. 2-4 illustrate the manufacture of the seal 10 in accordance with the present invention. Basically, exhaust seal 10 is produced by placing a flexible strip of refractory sheet material 16 inside of and in longitudinal alignment with a knitted wire mesh sleeve or "stocking" 18, as shown in FIG. 2. Various well-known sheet refractory materials can be used for the strip 16 such as those including graphite or bonded MICA.

The respective lengths of the strip 16 and mesh sleeve 18 are arranged to suit the finished size of the seal 10. The widths of the strip 16 and mesh sleeve 18 are also chosen to suit each seal design, these widths being as great as two or more times the height of the finished seal, respectively.

Mesh sleeve 18 is then tightly wound about a cylindrical mandril with the strip 16 confined therein to define a generally cylindrical preform, as depicted by 20 in FIG. 3. The outer surfaces of the mesh sleeve 18 are maintained in substantial contact with each other within the entire preform wall. The preform is then secured in its desired form as by stapling or welding at one or more locations through its wall.

The wound preform is then loaded into a conventional compression die (unshown) which has a cavity formed to correspond substantially to the dimensions of the finished seal 10. The die is designed in a well known manner so that compression force is applied axially to the preform 20. After inserting the preform into the die, an axial load is applied of sufficient force to cause it to collapse to the desired size and shape of the finished seal 10. During the pressing operation, the sheet and the wire mesh sleeve are mutually substantially deformed. This causes them to become firmly interlocked to provide a high degree of mechanical stability and structural integrity to the seal 10, the sheet material permeating the voids in the mesh as illustrated in FIG. 4.

As an example, an exhaust seal including mica sheet material, having a finished height of about 0.67 inches (1.70 cm.) and an inner diameter of about 2.04 inches (5.18 cm.) is manufactured in accordance with the present invention as follows.

A wire mesh, about 3 inches (7.62 cm.) wide and about 23.5 inches (59.7 cm.) in length is cut from a sleeve of knitted steel mesh in which the mesh wire diameter is about 0.011 inches (0.279 mm.), and the openings or voids between adjacent wires are in the range of from about 0.125 inches (3.18 mm.) to 0.250 inches (6.35 mm.). The cut sleeve of wire mesh is then degreased by dipping in a solvent solution or other conventional means.

A 0.015 inch (0.38 mm) thick silicons bonded mica paper sheet, such as No. 22-05-25 supplied by Midwest Mica and Insulation Company, Cleveland, Ohio, is prepared by cutting it into a strip measuring about 16.5 inches (41.9 cm.) in length, by about 2.5 inches (6.35 cm.) in width.

The cut mica strip is then inserted within the cut mesh sleeve 18 (FIG. 2), leaving about 6.75 inches (17.15 cm.) of the mesh sleeve 18 unfilled at one end. Strip 16 is then fastened in this position inside of the mesh sleeve by a staple.

Next, sleeve 18 is closely wound about itself with the aid of a cylindrical mandril, beginning with the unfilled end 22, as indicated in FIG. 3. After being wound, the preform thereby defined is tack welded or staped at several locations through its wall to retain its shape when removed from the mandril.

The preform is then loaded into a conventional hand die and axially compressed with an approximately 75 ton load. After compression is relaxed, the finished seal 10 is mechanically ejected from the die.

It is further noted that the seal 10 produced as described above exhibits desirable resiliency characteristics under actual operating conditions, thereby making it especially well suited for tolerating rotative movement and stress on its bearing surface while still maintaining an effective seal.

While the foregoing description has been primarily directed to applications of the seal 10 in which relative rotative movement and stress must be tolerated, it will be understood that the seal of the present invention may be effectively used in other applications, not only in the automotive field, but in marine and aviation as well, for example.

As will be readily apparent to those skilled in the art, the present invention may be realized in other specific forms without departing from its spirit or essential characteristics. The present embodiment is, therefore, to be considered as illustrative and not restrictive, the scope of the invention being indicated by the claims rather than by the foregoing description, and all changes which come within the meaning and range of equivalence of the claims are therefore intended to be embraced therein.

What is claimed is:

1. A method of producing a substantially coherent high temperature composite seal comprising the steps of positioning a sheet of flexible refractory sheet material between two layers of knitted wire mesh, said wire mesh being formed of wire and having voids of given size between said wires, constructing a generally cylindrical preform of said flexible refractory sheet material and flexible knitted wire mesh, disposing said preform in a compression die, said die having a cavity size and shape which is substantially the same as the desired composite seal, and applying an axial load to said preform, said load being of sufficient force to collapse said preform to substantially the size and shape of said composite seal and to cause said refractory material to substantially fill the openings in said wire mesh and to become firmly interlocked with said wire mesh.

2. A method of producing a substantially coherent high temperature composite seal comprising the steps of positioning a sheet of flexible refractory sheet material between two layers of knitted wire mesh, said wire mesh being formed of wire and having voids of given size between said wires, constructing a preform comprising said flexible refractory sheet material and knitted wire mesh, said preform having an axis, an open central portion surrounding said axis, a wall formed at a selected distance from said axis bounding said open central portion, said wall including said refractory material and knitted wire mesh, disposing said preform in a compression die, said die having a cavity size and shape which is substantially the same as the desired composite seal, and applying an axial load to said preform, said load being of sufficient force to collapse said preform to substantially the size and shape of the composite seal and to cause said refractory material to substantially fill the openings in said wire mesh and to become firmly interlocked with said wire mesh.

3. A method of producing a substantially coherent high temperature composite seal comprising the steps of positioning a sheet of flexible refractory sheet material between two layers of knitted wire mesh, said wire mesh being formed of wire and having voids of given size between said wires, constructing a preform comprising said flexible refractory sheet material and knitted wire mesh, said preform having an axis, an open central portion surrounding said axis, a wall formed at a selected distance from said axis bounding said open central portion, said wall including said refractory material and knitted wire mesh, said wall having a dimension at right angles to said axis substantially equal to a corresponding dimension of said final seal, said preform having a height in the axial direction of at least one and one half times the final height of the seal, disposing said preform in a compression die, said die having a cavity size and shape which is substantially the same as the desired composite seal, and applying an axial load to said preform, said load being of sufficient force to collapse said preform to substantially the size and shape of the composite seal and to cause said refractory material to substantially fill the openings in said wire mesh and to become firmly interlocked with said wire mesh.

* * * * *